US009571391B2

(12) United States Patent
Tsiatsis et al.

(10) Patent No.: US 9,571,391 B2
(45) Date of Patent: Feb. 14, 2017

(54) METHODS AND NODES FOR HANDLING AN ADDRESS OF A RESOURCE

(75) Inventors: Vlasios Tsiatsis, Solna (SE); Hjalmar Olsson, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 41 days.

(21) Appl. No.: 14/409,142

(22) PCT Filed: Jun. 25, 2012

(86) PCT No.: PCT/EP2012/062204
§ 371 (c)(1),
(2), (4) Date: Dec. 18, 2014

(87) PCT Pub. No.: WO2014/000756
PCT Pub. Date: Jan. 3, 2014

(65) Prior Publication Data
US 2015/0156111 A1    Jun. 4, 2015

(51) Int. Cl.
*H04L 12/28* (2006.01)
*H04L 12/721* (2013.01)
*H04L 29/12* (2006.01)
*H04L 12/933* (2013.01)

(52) U.S. Cl.
CPC .............. *H04L 45/72* (2013.01); *H04L 49/10* (2013.01); *H04L 61/10* (2013.01); *H04L 61/301* (2013.01); *H04L 61/6072* (2013.01); *H04L 61/3015* (2013.01)

(58) Field of Classification Search
CPC ............. H04L 12/2803; H04L 12/2807; H04L 12/2814; H04L 12/2816
USPC ........ 370/254, 310, 315, 465; 709/238, 244, 709/246
See application file for complete search history.

(56) References Cited

U.S. PATENT DOCUMENTS

| 6,957,224 | B1 | 10/2005 | Megiddo et al. |
| 7,136,709 | B2 * | 11/2006 | Arling .................... G05B 15/02 340/3.1 |
| 8,526,352 | B2 * | 9/2013 | Murphy ........................ 370/310 |
| 8,775,683 | B2 * | 7/2014 | Stokking ............. H04L 12/2807 709/249 |
| 2002/0103850 | A1 * | 8/2002 | Moyer .............. H04L 29/06027 709/202 |
| 2005/0111486 | A1 * | 5/2005 | Lee ..................... H04L 12/2803 370/465 |
| 2009/0141741 | A1 | 6/2009 | Kim et al. |
| 2009/0146833 | A1 | 6/2009 | Lee et al. |
| 2012/0023539 | A1 * | 1/2012 | Nagashima ........ H04N 21/4135 725/116 |
| 2013/0191518 | A1 * | 7/2013 | Narayanan ............. H04L 67/16 709/220 |
| 2015/0327304 | A1 * | 11/2015 | Tinnakornsri-suphap ............... H04L 41/0809 709/227 |

* cited by examiner

*Primary Examiner* — Dmitry H Levitan
(74) *Attorney, Agent, or Firm* — Rothwell, Figg, Ernst & Manbeck, P.C.

(57) ABSTRACT

A method in gateway node (100) for handling an address of a resource of a device (110) in a communications network, the method comprising: generating a first alias representing the address of the device (110) resource, storing the generated alias, in association with the address, receiving a request from an application (120) including the address of the device (110) resource, translating the address to the stored alias, and forwarding the request including the alias to the device (110), thereby enabling the device to resolve the request by use of the alias in said request.

33 Claims, 5 Drawing Sheets

METHODS AND NODES FOR HANDLING AN ADDRESS OF A RESOURCE

CROSS-REFERENCE TO RELATED APPLICATION

This application is a 35 U.S.C. §371 National Phase Entry Application from PCT/EP2011/062204, filed Jun. 25, 2012, and designating the United States.

TECHNICAL FIELD

The present disclosure relates generally to methods and nodes for handling of an address of a resource of a device in a communications network.

BACKGROUND

The usage of machine to machine communication is expected to grow. Typically machine to machine communication is defined as communication between machines, computers, computerized systems, etc, without human interaction. Further the number of devices connected to communication networks is expected to grow in the future. With an increasing number of connected devices, capable of communication, the machine to machine communication may take advantage of the connected devices.

The devices may be providing a wide variety of features. In the area of home automation, devices may be providing sensor capabilities such as, sensing temperature, humidity, open/closed/locked doors or windows, energy meters, water meters and similar, as well as various actuators such as for turning on heater/cooler, switching lights or pumps on/off, and similar applications related to home automation. Another area that can use machine to machine communication is security and surveillance related to homes and offices. Various sensors such as motion sensors, smoke detectors, cameras, etc, are connected to local or central security systems, which in turn are connected to actuators such as sirens, sprinklers, speakers, etc. Another area is automotive where vehicles may include a wide range of different kind of sensors and actuates. Another area is transportation and logistics where both logistics centers as well as vehicles for transportation may contain both sensors and actuators for tracking of or creation of documents at certain toll gates. Material and goods may contain sensors and/or actuators, for example to monitor or control that certain quality requirements are fulfilled, such as temperature or mechanical shock.

Today's technology may provide substantial computing power through various processors integrated into CPU's (Central Processing Units) or other types of integrated chips. Further, it is possible to meet various bandwidth needs both through wired as well as wireless technologies for communication. Over the wired or wireless communication networks, there are a variety of protocols which may enable communication. A few examples of such protocols are: TCP/UDP IP (Transfer Control Protocol/User Datagram Protocol/Internet Protocol), UPnP (Universal Plug and Play), Bonjour, Z-wave, ZigBee, CoAP (Constrained Application Protocol), TR069 (Technical Report 069), plain text (e.g. txt files), XML (eXtensible markup Language), or JSON (JavaScript Object Notation), e-mail, http (Hypertext Transfer protocol), https (http secure), ftp (file transfer protocol), SIP (Session Initiation Protocol), Bluetooth, as well as proprietary protocols such as ANT+ (proprietary wireless sensor network technology), not limiting usage of other protocols. At least some of the above mentioned protocols are considered high level protocols. When adopting devices for connection via such protocols, it is easy for application and device developers to connect applications or devices to the Internet or other communication networks. Commonly, messages over these protocols are communicated via plain text.

However, it is a desire to keep the cost of each device low, and to facilitate distribution and usage of various devices. Typically the more powerful processing unit, the higher cost. Another issue related to cost is power consumption. An increasing number of connected devices may add undesired electrical power consumption, which have a direct economical cost impact as well as going opposite to environmental policies focusing on reducing power consumption. In a case where a device is wirelessly connected to a communications network, it may carry some kind of electrical battery or other internal source of electrical energy. In such wireless device it is desired to prolong the battery life time as long as possible, to minimize the maintenance frequency, and if using a non-renewable battery, minimize the battery waste.

A problem with today's solutions is a contradiction between creation of devices which are capable to use convenient support high level protocols and capable to support various application developer's desires, and at the same time keep the manufacturing cost of a single device as low as possible. Another problem is how to make communication with devices simple in such a manner that requests and responses are processed as quickly as possible. Another problem is how to minimize energy use in a wired network, or how to preserve energy in wireless devices. From a user perspective it may also be a problem how to name various devices, for example, in a home environment, such that devices are easy to recognize for everybody in a family.

SUMMARY

It is an object of embodiment described herein to address at least some of the problems and issues outlined above. It is possible to achieve these objects and others by using methods and nodes and computer programs as defined in the attached independent claims.

According to one aspect, a method is performed in a gateway node for handling an address of a resource of a device in a communications network. The method comprises generating a first alias representing the address of the device resource, and storing the generated alias, in association with the address. The method further comprises receiving a request from an application including the address of the device resource. The method further comprises translating the address to the stored alias. The method further comprises forwarding the request including the alias to the device, thereby enabling the device to resolve the request by use of the alias in said request.

According to one aspect, a method is performed in a device for handling a request addressed to a resource of the device in a communications network, the method comprises generating a first alias representing the address to the device resource. The method further comprises storing the generated alias, in association with the address. The method further comprises receiving a request from a gateway node including the alias of the device resource. The method further comprises processing the request, thereby enabling the device to resolve the request by use of the alias in said request.

An advantage with use of an alias instead of the original address is that an alias may be easier to resolve for a device.

The device may need less CPU clock cycles, and/or less signaling messages to resolve the alias.

According to another aspect, a gateway node is provided, arranged to handle an address of a resource of a device in a communications network. The gateway node is arranged to generate an alias representing the address of the device resource. The gateway node is further arranged to store the generated alias, in association with the address. The gateway node is further arranged to receive a request from an application including the address of the device resource. The gateway node is further arranged to translate the address to the alias. The gateway node is further arranged to forward the request including the alias to the device, thereby enabling the device to resolve the request by use of the alias in said request.

According to another aspect, a device is provided, arranged to handle a request addressed to a resource of the device in a communications network. The device is arranged to generate a first alias representing the address to the device resource. The device is further arranged to store the generated alias, in association with the address. The device is further arranged to receive a request from a gateway node including the alias of the device resource. The device is further arranged to process the request, thereby enabling the device to resolve the request by use of the alias in said request.

An advantage for a device to use the alias, instead of the original address, is that the device may have a lower cost of production due to that the CPU, etc may be less powerful. Another advantage with the use of the alias is that the device may need less electrical energy for operation, due to less CPU clock cycles and/or less signaling messages to be transmitted. Thus a battery operated device may stay operational for a longer period.

According to another aspect, a computer program is provided, comprising computer readable code means, which when run in a gateway node for handling an address of a resource of a device causes the gateway node for handling an address of a resource of a device to perform the corresponding method. Further is a computer program product, comprising a computer readable medium and a computer program provided, wherein the computer program is stored on the computer readable medium.

According to another aspect, a computer program is provided, comprising computer readable code means, which when run in a device for handling a request addressed to a resource of the device causes the device for handling a request addressed to a resource of the device to perform the corresponding method. Further is a computer program product, comprising a computer readable medium and a computer program provided, wherein the computer program is stored on the computer readable medium.

The above method and apparatus may be configured and implemented according to different optional embodiments. In one possible embodiment, the alias is stored in a database in the gateway node. In another embodiment a second alias generated by the device is received from the device and stored in the database. In another embodiment a resource request is transmitted to the device. In another embodiment a resource inventory is received from the device. In another embodiment a request for alias generation is transmitted to a central alias node. In another embodiment the alias points to a specific memory segment of the device. In another embodiment a plurality of aliases are associated with one address.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided for handling of addresses of recourses in devices. An address of a resource of a device, for example a temperature indicator in a device, may be a URL (Uniform Resource Locator) or a URI (Uniform Resource Identifier). These are practical to use when connecting devices to the global Internet, or to similar closed TCP/IP-networks. Such address may in practice be defined by a long string of characters. To resolve a URL, it may take a number of messages back and forth between the device and a gateway node, and it may require the device to use a number of clock cycles for each character in the URL to resolve it.

By exchanging the address with an alias, it will be possible to handle the addressing of devices connected to a network, for example, in a home environment in a simpler and faster way than handling the original address. A device may have several resources that typically need to be addressed individually. A single device may create an alias for each resource, where the alias is shorter than the original address of that resource. Alternatively the gateway node may create an alias for each resource of the device, and instruct the device to store the aliases. By this solution it may be possible for a device to resolve a request faster and with less energy consumption, than with the full long Internet URL due to the shorter length of the alias. The gateway node is further arranged to keep track of the aliases used by various devices in a communications network. When a request comes from an application, for example a request for a temperature in a specific location, the gateway node translates the address used by the application to the alias used by a device with a temperature sensor recourse at the specific location.

Figure 1:
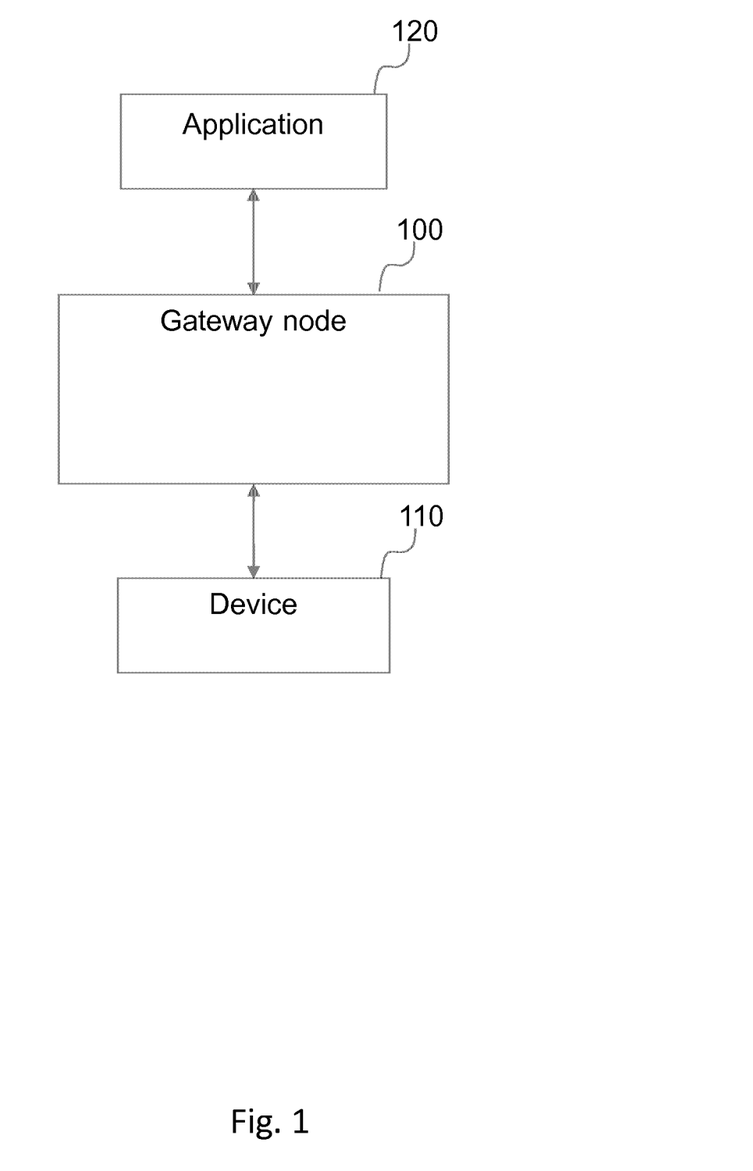
FIG. 1 is a communication scenario where the solution may be used.

FIG. 1. shows a block diagram of a scenario where the solution may be used, with a gateway node 100 arranged between a device 110 and an application 120. According to this scenario, the application 120 connects via the gateway node 100 to the device 110. Examples of a gateway node 100 are: ADSL (Asymmetric Digital Subscriber Line) routers, wireless LAN (Local Area Network) access devices, fiber-to-the-home termination devices, access points for wireless devices, mobile terminals, vehicle arranged terminals, home automation access units, TV set top boxes, pluggable PC's (miniaturized network connected PC), and similar network access points, not limiting to other units. As an example, the gateway node 100 may be operated by computer program code according to the OSGi (Open Services Gateway initiative), as well as other unix-based systems, or other proprietary systems suitable for a gateway node 100. Typically the gateway node 100 acts as a bridge or interconnection point between one network, such as the Internet, or other public networks. Bridging to another network, such as a private network. Examples of private networks are: home network, corporate network, vehicle network, PAN (Personal Area Network) not limiting to other similar types of networks.

A few non-limiting examples of different kinds of devices 110 with sensor resources are: water meters, gas meters, electricity meters, current sensors, voltage sensors, GPSs (Global Positioning System), cameras, video cameras, microphones, motion sensors, altitude sensors, barcode readers, RFID (Radio Frequency Identification) readers and Near Field Communications readers/tags, accelerometers, gyroscopes, shock sensors, switch sensors, light sensors, air pressure sensors, wind speed sensors, soot sensors, NOx (Nitrogen oxide) and Cox (Carbon oxide) sensors, braking systems sensors, door lock sensors, air bag sensors, electronic battery sensors, tire pressure sensor, fluid (gas, oil, cooling) level sensors, not limiting other sensors to be used in this solution. A few examples of devices 110 with actuator resources are: switches, sirens, valves, speakers, heaters, coolers, breaks, not limiting other types of actuators to be used in relation to this solution.

An application 120 may be a web application for presentation of data, a home automation application, facility management application, surveillance application, vehicle management application, not limiting the application to other similar areas.

Figure 2:
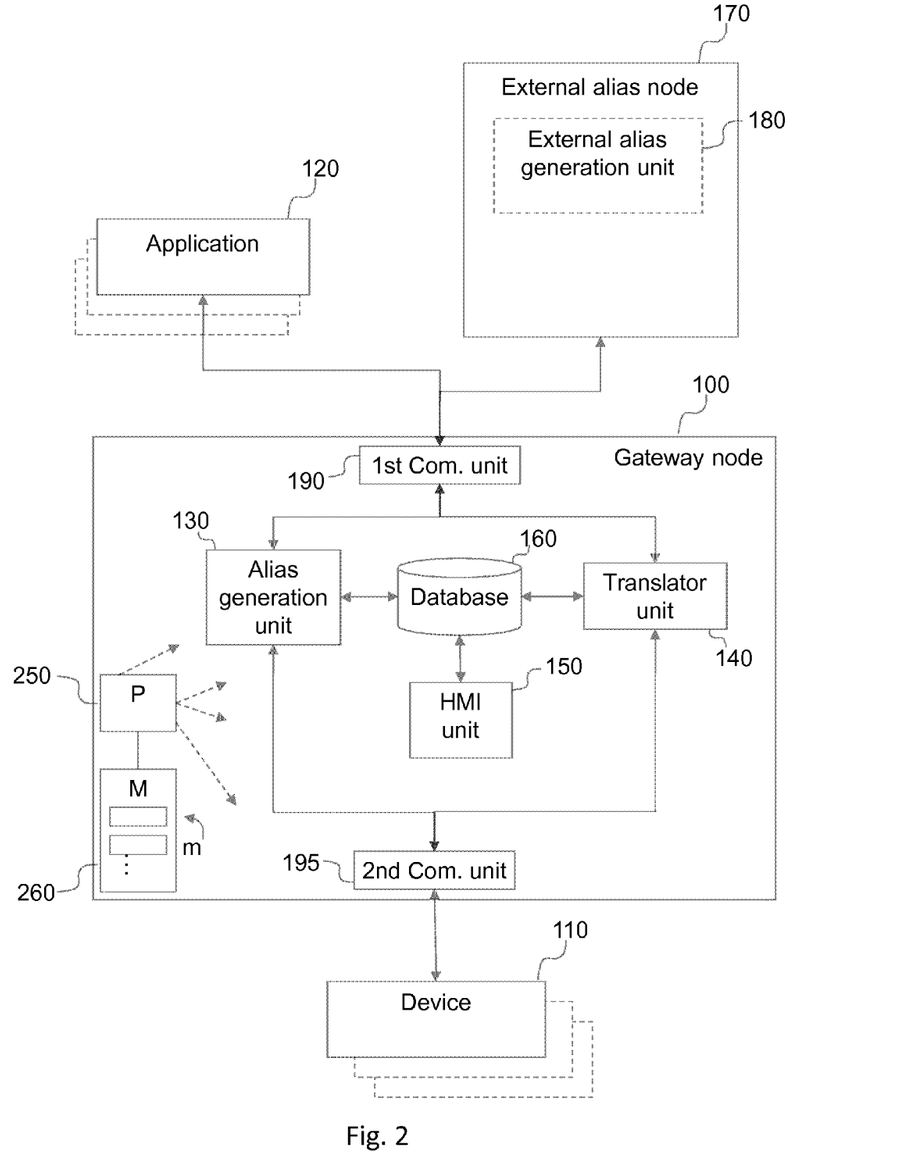
FIG. 2 is a block diagram illustrating the solution, according to some possible embodiments.

Now turning to FIG. 2, which shows an embodiment of the gateway node 100 in more detail, the gateway node 100 comprising an alias generation unit 130, a translator unit 140, a HMI (Human Machine Interface) unit 150 and a database 160. In addition to the device 110 and the application 120, FIG. 2 also shows an optional external alias node 170, with a external determination unit 180. Additionally a processor "P" 250 and a memory "M" 260 are included in the gateway node 100. FIG. 2 also shows a first communication unit 190 "1st Com. unit" and a second communication unit 195 "2nd Com. unit".

The alias generation unit 130 may generate a suitable alias for a resource based on an address of that resource. A non limiting example is as follows: based on a URL of a temperature sensor in a device, for example "192.168.100.2/sensors/temperature3", the alias generation unit 130 may be arranged to determine that the alias for that resource should be represented by "/_3". Another example may be that the alias generation unit 130 determines that an URL, for example "192.168.100.2/sensors/values/temperature4" should be represented by an hexadecimal string such as "0xAB12D479". In this latter example, the alias is pointing directly at a particular memory area in a device 110. Another example is to use the last 32 bits of an URL. The determined alias which is associated with the address of a resource may be stored in the database 160.

According to an embodiment, the translator unit 140 is arranged to translate an address included in a request from an application, where the address points to a specific resource at a specific device 110. So when a request referring to an address is sent from an application 120 to the gateway node 100, the gateway node 100 may translate the address to an alias and replace the address in the request with the alias, before forwarding the request to a device 110. In an embodiment, the translator unit 140 looks up the corresponding alias for the address in the database 160. The gateway node 100 may also perform other more conventional kinds of tasks, for example IP-address translation, port translation, protocol translation, session control, state control, etc. Such other tasks are however outside the scope of this document, and therefore not further described herein.

According to an embodiment it may be possible to link or associate a plurality of aliases to one alias or to an original address of a resource. An example is where an alias may be determined by a user of a device 110 or an application 120. Such an alias may, for example, be indicating the location of a device 110 in plain text, or its tasks. However the alias may be suitable for a user but may not be an optimal alias for the device 110, and therefore a plurality of aliases pointing at the same resource of a device 110 may be advantageous to use. In an embodiment, a user may add or edit an alias via the HMI unit 150. The plurality of aliases associated with a resource may be stored in the database 160. The plurality of aliases may be defined as the first alias, the second alias, the third alias, and so on.

According to an embodiment a first alias may be generated by the gateway node 100, and a second alias may be generated by the device 110. Thereby the both aliases may be pointing at the same original device resource. This feature is advantageous in a solution with a mix of devices both generating their own aliases as well as accepting aliases generated by the gateway node 100 or the external alias node 170.

According to an embodiment, the external alias node 170, shown in FIG. 2, may be arranged to receive a request from the gateway node 100, the request asking for which alias to use for an address. The external alias node 170 may include the external alias generation unit 180, which may be arranged to determine a suitable alias for an address. In a non-limiting example embodiment, the external alias node 170 may be an IPSO (IP IN NETWORKS OF 'SMART OBJECTS) Server. The first communication unit 190, shown in FIG. 2, may handle communication with the application 120 and/or the external alias node 170. The first communication unit 190 may also handle other types of external communication of the gateway node 100. Other terms for the first communication unit 190 may be external interface, WAN (wide area network) interface, or similar. The second communication unit 195 may handle communication with the device 110. The second communication unit 195 may also handle other types of communication on the inside of the gateway node 100. Other terms for the second communication unit 195 may be LAN (local area network) interface, default gateway, or similar.

Figure 3:
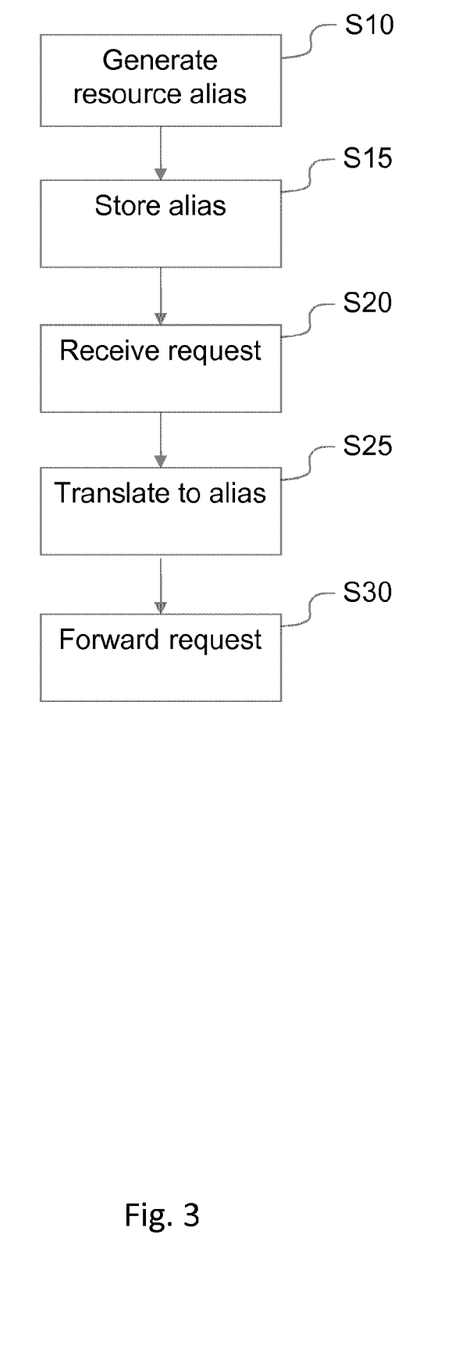
FIG. 3 is a flow chart illustrating a procedure in a gateway node.

A procedure for handling of an address, will now be described with reference to the flowchart in FIG. 3, illustrating procedure steps performed in a gateway node such as the above node 100. The procedure illustrated in FIG. 3 is thus directed to handling an address of a resource of a device.

In a first step S10, an alias for an address of the resource is generated. The alias may be used by the gateway node 100, instead of the original address. The generated alias thus represents the address. Examples of address types for which aliases may be generated are: a URL, an URI, or similar, not limiting other address formats to be used. Examples of alias formats that may be used are a MAC-address (Media Access Control), or a CoAP URL, such as coap://192.168.0.1:56831_3, In a next step S15, the generated alias is stored at the gateway node together with the address. The alias is thus stored such that an association is created with the address the alias represents.

In step S20, a request is received by the gateway node 100, typically a request from an application 120, requesting a resource at a device 110. The request includes an address to the resource. In step S25 the address is translated from the address to the alias. In step S30 the request is forwarded to the device 110.

Figure 4:
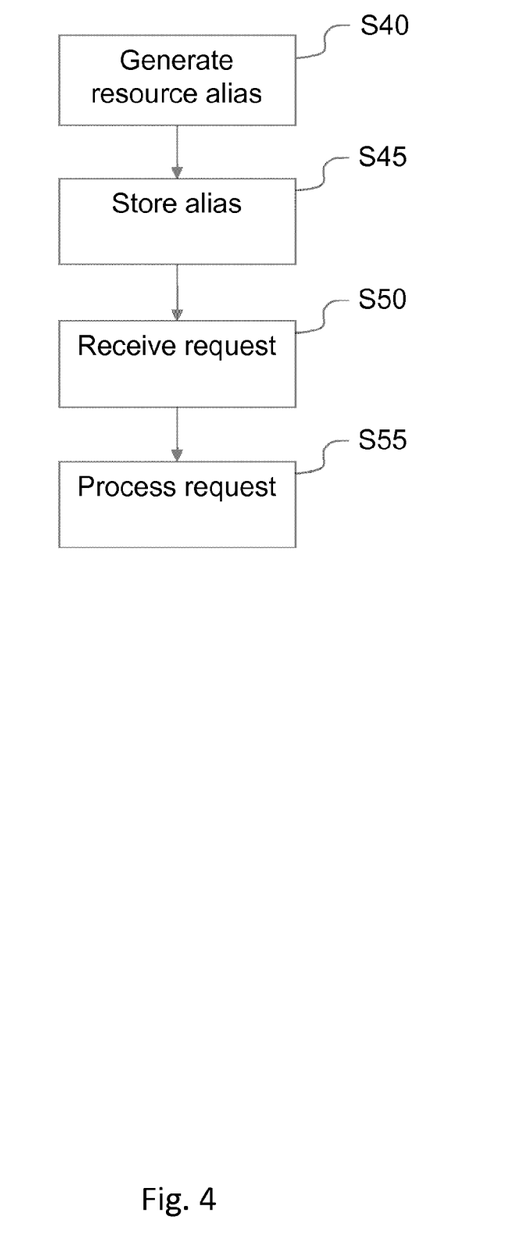
FIG. 4 is a flow chart illustrating a procedure in a device.

A procedure for handling an address will now be described with reference to the flowchart in FIG. 4., illustrating procedure steps performed in a device such as the above device 110. The procedure illustrated in FIG. 4 is thus directed to handling of an address of a resource of a device. In a first step S40, an alias for an address is generated. The alias may be used by the gateway node 100, instead of the original address, to reach a resource at the device 110. The generated alias represents the address. In step S50 a request is received to the device 110. Typically a request from a gateway node 100, requesting a resource at the device 110. The request includes the alias to the resource. In step S55 the request is processed, according to the request.

Figure 5:
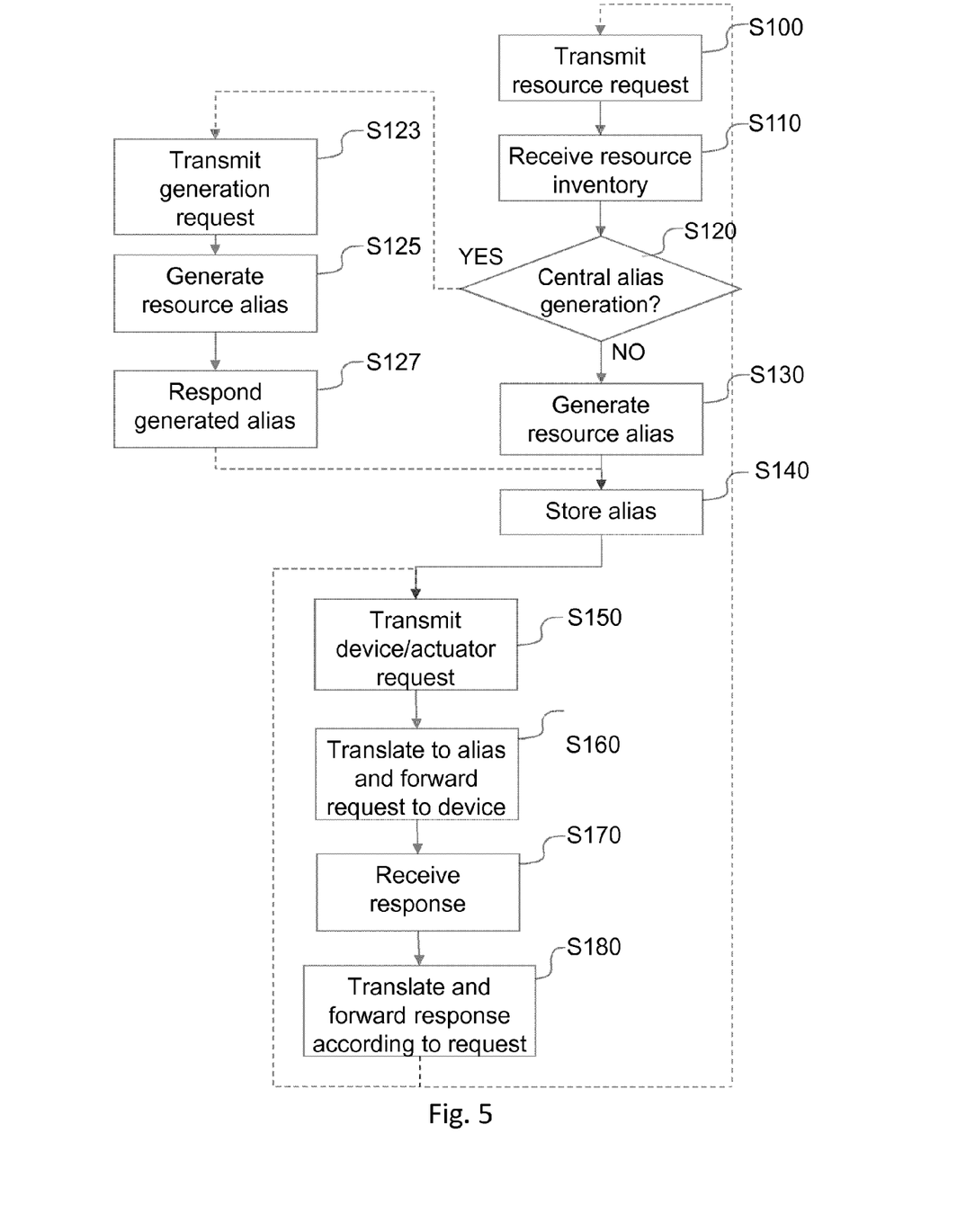
FIG. 5 is a flow chart illustrating a procedure in a gateway node, according to further possible embodiments.

FIG. 5 illustrates a more detailed example of a procedure for handling an address by generating and using an alias. The shown actions are performed by a gateway node. In various embodiments, it may be possible to perform only a subset of the shown procedure steps, and in different orders than illustrated.

In step S100, a gateway node such as the above node 100, may transmit a resource request to a device 110. Such a request may ask the device 110 to provide a list of its resources including the addresses to the resources. In step S110, the resource inventory list is received from the device. The list may contain at least an address to a resource at the device 110. Depending on the type of device, it may be a single sensor or single actuator at the device 110. It may also be a plurality of sensors and/or actuators with the device 110. In a step S120 it may be determined, if an external alias node 170 should be consulted, or not. If it is determined in step S120 that the gateway node 100 should generate an alias for each address, and not by an external node, the procedure continue to step S130, where the alias for the address is generated. If it is determined in step S120 that the external alias node 170 should be consulted, the procedure may after S120 continue to step S123 where a request is transmitted from the gateway node 100 to the external alias node 170. Such request may at least contain an address, an address to a resource at a device 110.

However, the request may also contain additional data such as networks id's, protocol information, device ids, device manufacturer, hardware and/or software versions, and similar types of relevant information. In a next step S125 the request may be sent to the external alias node 170. The external alias node 170 may after this step generate the suitable alias for the address provided in the request. In an embodiment, the alias may be generated by the external alias generation unit 180. In step S127 the external alias node 170 may respond with a generated alias which is received by the gateway node 100. In an embodiment the external alias node 170 may contain an IPSO server. In an embodiment the external alias node 170 is a IPSO server. When the alias is generated, by the gateway node 100, or by the external alias node 170, the alias is in step S140 stored in association with corresponding address. The alias may be stored in a database 160 in the gateway node 100. A storage message may be transmitted to a device 110, with an instruction to store the alias with the device 110.

In a step S150 the gateway node may receive from an application a request addressed to a resource of a device. In step S160, the gateway node 100 may translate the address to the corresponding alias, and then forward the request to the device 110. In a step S170, a response is received from the device 110 having processed the request. An advantage with usage of the alias, instead of the original address, is that the device may use less signaling recourses and less CPU clock cycles, to resolve the alias instead of the full address.

When the request has been processed, by the device 110, it may respond the result to the gateway node 100, as of step S170. In an embodiment the device 110 may be required to respond to the gateway node 100, according to the request. In a next step S180, the gateway node 100 may, translate the alias of the resource of the device back to the original address provided by the application 120 and forward the response according to the request.

The functional units 100, 110, 130, 140, 150, 160 described above may be implemented in the gateway node 100 and/or device 110, by means of program modules of a respective computer program comprising code means which, when run by processors "P" 250 causes the gateway node 100 and/or device 110 to perform the above-described actions. The processor P 250 may comprise a single Central Processing Unit (CPU), or could comprise two or more processing units. For example, the processor P 250 may include general purpose microprocessors, instruction set processors and/or related chips sets and/or special purpose microprocessors such as Application Specific Integrated Circuits (ASICs). The processor P 250 may also comprise a storage for caching purposes.

Each computer program may be carried by computer program products "M" 260 in the gateway node 100 and/or device 110, shown in FIG. 2a, in the form of memories having a computer readable medium and being connected to the processors P. Each computer program product M 260 or memory thus comprises a computer readable medium on which the computer program is stored e.g. in the form of computer program modules "m". For example, the memories M 260 may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the gateway node 100 and/or device 110.

While the solution has been described with reference to specific exemplary embodiments, the description is generally only intended to illustrate the inventive concept and should not be taken as limiting the scope of the solution. For example, the terms "address", "alias" and "resource" have been used throughout this description, although any other corresponding nodes, functions, and/or parameters could also be used having the features and characteristics described here. The solution is defined by the appended claims.

The invention claimed is:

1. A method performed in a gateway node for handling requests addressed to a device in a communications network, the method comprising:

the gateway node obtaining a first alias representing a resource identifier;

the gateway node storing the first alias in association with the resource identifier;

the gateway node receiving from an application a first request addressed to the device, the first request comprising the resource identifier; and in response to receiving the first request:

a) the gateway node obtaining the first alias representing the resource identifier;

b) the gateway node generating a second request comprising the obtained first alias, wherein the generating the second request includes modifying the first request by replacing the resource identifier with said first alias; and c) the gateway node forwarding the second request comprising the obtained first alias to the device, thereby enabling the device to process the second request by use of the obtained first alias in said second request.

2. The method according to claim 1, wherein the obtained first alias is stored in a database in the gateway node.

3. The method according to claim 2, wherein a second alias generated by the device is received by the gateway node in a message from the device and stored in the database.

4. The method according to claim 1, wherein a resource inventory is received from the device.

5. The method according to claim 1, wherein a request for alias generation is transmitted to a central alias node, wherein the central alias node transmits the obtained first alias to the gateway node in response to receiving the request for alias generation.

6. The method according to claim 1, wherein the obtained first alias points to a specific memory segment of the device.

7. The method according to claim 1, wherein a plurality of aliases are associated with one resource identifier.

8. A non-transitory computer readable medium comprising computer readable code, which when run in a gateway node for handling an address of a resource of a device causes the gateway node to perform the corresponding method according to claim 1.

9. The method according to claim 1, wherein the resource identifier is one of a Uniform Resource Identifier (URI) having a string length of L characters and the first alias has a string length of l characters, wherein 1<L.

10. The method according to claim 1, wherein the first alias is received from a central alias node that generated the first alias.

11. The method of claim 1, wherein the device resolves the second request by using the first alias to obtain the resource identifier.

12. A method performed in a device for handling a resource request, the method comprising:
the device generating a first alias representing a resource identifier for identifying a resource accessible to the device;
the device storing the generated first alias association with the resource identifier;
the device receiving from a gateway node, in response to the gateway node receiving from an application a message including the resource identifier, a request comprising a second alias, that replaces the resource identifier in the message; and
the device processing the first request using the second alias in said first request.

13. The method according to claim 12, wherein the first alias is stored in the device.

14. The method according to claim 12, further comprising:
the device transmitting to the gateway node the first alias prior to the device receiving the request from the gateway node.

15. The method according to claim 12, wherein the second alias is generated by the gateway node and is received and stored by the device.

16. The method according to claim 12, wherein a resource request is received from the gateway node.

17. The method according to claim 12, wherein a resource inventory is transmitted to the gateway node.

18. The method according to claim 12, wherein the alias points to a specific memory segment of the device.

19. A non-transitory computer readable medium comprising computer readable code, which when run in a device for handling a request addressed to a resource of the device causes the device to perform the corresponding method according to claim 12.

20. A gateway node arranged to handle an address of a resource of a device in a communications network, to the gateway comprising:
memory;
a processor coupled to the memory, wherein the processor is configured to:
generate an alias representing the address of the device resource,
store the generated alias, in association with the address,
receive a first request from an application including the address of the device resource,
generate a second request by modifying the first request by replacing the address of the device resource with the generated alias, and
forward the second request including the generated alias to the device, thereby enabling the device to process the second request by use of the generated at alias in said second request.

21. The node according to claim 20, wherein the processor is configured to store the generated alias in a database in the gateway node.

22. The node according to claim 20, wherein the processor is configured to receive and store a second alias from the device generated by the device.

23. The node according to claim 20, wherein the processor is configured to transmit a resource request to the device.

24. The node according to claim 20, wherein the processor is configured to receive a resource inventory from the device.

25. The node according to claim 20, wherein the processor is configured to transmit a request for alias generation to a central alias node, wherein the central alias node transmits the obtained first alias to the gateway node in response to receiving the request for alias generation.

26. The node according to claim 20, wherein the alias points to a specific memory segment of the device.

27. The node according to claim 20, wherein a plurality of aliases are associated with one address.

28. A device arranged to handle a request addressed to a resource of the device in a communications network, the device comprising:
a memory; and
a processor coupled to the memory, wherein the processor is configured to:
generate a first alias representing an address to the device resource,
store the generated first alias, in association with the address,
receive from a gateway node, in response to the gateway node receiving from an application a message including the address to the device resource, a request including a second alias that replaces the address to the device resource in the message, and
process the request by use of the second alias in said request.

29. The device according to claim 28, wherein the processor is further configured to transmit the first alias to the gateway node.

30. The device according to claim 28, wherein the processor is further configured to receive and store the second alias that is generated by the gateway node.

31. The device according to claim 28, wherein the processor is further configured to receive a resource request from the gateway node.

32. The device according to claim 28, wherein the processor is further configured to transmit a resource inventory to the gateway node.

33. The device according to claim 28, wherein the first alias points to a specific memory segment of the device.

\* \* \* \* \*